US011176624B2

(12) United States Patent
Chu et al.

(10) Patent No.: US 11,176,624 B2
(45) Date of Patent: Nov. 16, 2021

(54) PRIVACY-PRESERVING SMART METERING

(71) Applicant: International Business Machines Corporation, Armonk, NY (US)

(72) Inventors: Stephen Mingyu Chu, Beabercreek, OH (US); Min Gong, Shanghai (CN); Dong Sheng Li, Shanghai (CN); Jun Chi Yan, Shanghai (CN); Wei Peng Zhang, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 869 days.

(21) Appl. No.: 15/249,564

(22) Filed: Aug. 29, 2016

(65) Prior Publication Data
US 2018/0060976 A1    Mar. 1, 2018

(51) Int. Cl.
*G06Q 50/06*       (2012.01)
*H04L 9/08*        (2006.01)

(52) U.S. Cl.
CPC .............. *G06Q 50/06* (2013.01); *H04L 9/085* (2013.01); *G06Q 2220/00* (2013.01); *H04L 2209/805* (2013.01); *Y04S 40/20* (2013.01)

(58) Field of Classification Search
None
See application file for complete search history.

(56) References Cited

U.S. PATENT DOCUMENTS 1,310,719 A    7/1919  Vernam
8,667,292 B2 *  3/2014  Danezis ................ H04L 9/3247
                                    713/179
8,731,199 B2    5/2014  Jawurek et al.
8,832,429 B2 *  9/2014  Gomez Marmol ... H04L 63/065
                                    713/153
2006/0008082 A1 *  1/2006  Gluck .................. H04L 63/0428
                                    380/28
2012/0089494 A1 *  4/2012  Danezis ............... G06Q 20/102
                                    705/34
2012/0204026 A1 *  8/2012  Shi .......................... H04L 9/088
                                    713/155

(Continued)

FOREIGN PATENT DOCUMENTS

EP            1691501 A1 *  8/2006  ........... H04L 9/3006

OTHER PUBLICATIONS

Horne et al. "Privacy, technology, and norms: The case of Smart Meters" (Social Science Research 51 (2015) 64-76. (Year: 2015).*

(Continued)

*Primary Examiner* — Neha Patel
*Assistant Examiner* — Clay C Lee
(74) *Attorney, Agent, or Firm* — Cantor Colburn LLP; Joseph Petrokaitis

(57) ABSTRACT

Embodiments of the present disclosure provide method, system and computer program product for privacy preserving smart metering. According to one embodiment of the present disclosure, a plurality of customer-encrypted meter readings are received, each of the plurality of customer-encrypted meter readings being encrypted by a customer using a customer key, then a summation of customer keys is obtained, next the plurality of customer-encrypted meter readings are summed, and the summation of the plurality of customer-encrypted meter readings is decrypted based on the obtained summation of customer keys.

17 Claims, 3 Drawing Sheets

(56) References Cited

U.S. PATENT DOCUMENTS

| | | | |
|---|---|---|---|
| 2013/0124850 A1* | 5/2013 | Gomez Marmol | ... H04L 9/0891 713/150 |
| 2013/0170640 A1* | 7/2013 | Gentry | ......... H04L 9/3093 380/30 |
| 2013/0287204 A1* | 10/2013 | Davis | ......... H04L 9/0894 380/28 |
| 2014/0214685 A1 | 7/2014 | Le Buhan | |
| 2016/0182233 A1* | 6/2016 | Go | ......... H04L 9/3242 380/255 |
| 2017/0019248 A1* | 1/2017 | Mustafa | ......... H04L 9/007 |

OTHER PUBLICATIONS

Cavoukian et al, "Smartprivacy for the smart grid: embedding privacy into the design of electricity conservation" Identity in the Information Society 3.2 (Aug. 2010) pp. 275-294.

Efthymiou et al., "Smart grid privacy via anonymization of smart metering data" In Smart GridCommunications (SmartGridComm), 2010 First IEEE International Conference onSmart Grid Communications (Oct. 2010) pp. 238-243.

Garcia et al., "Privacy-friendly energy-metering via homomorphic encryption" International Workshop on Security and Trust Management (Sep. 2010) pp. 226-238.

LeMay et al., "Unified architecture for large-scale attested metering." 2007 40th Annual Hawaii International Conference on System Sciences (HICSS'07). IEEE, Jan. 2007 (10 pages).

Li et al., "Secure and privacy-preserving information aggregation for smart grids" International Journal of Security and Networks 6.1 (Jan. 2011) pp. 28-39.

National Institute of Standards and Technology (NIST) "Guidelines for Smart Grid Cyber Security" NISTIR 7628 Revision 1, vol. 1—Smart Grid Cybersecurity Strategy, Architecture, and High-Level Requirements (Sep. 2014) 668 pages.

Rial et al., "Privacy-preserving smart metering" Proceedings of the 10th annual ACM workshop on Privacy in the electronic society. ACM, (Oct. 2011) pp. 49-60.

Thoma et al., "Secure multiparty computation based privacy preserving smart metering system" 2012 North American power symposium (NAPS), IEEE, (Sep. 2012) pp. 1-6.

Wang et al., "A randomized response model for privacy preserving smart metering" IEEE transactions on smart grid 3.3 (May 2012) pp. 1317-1324.

* cited by examiner

PRIVACY-PRESERVING SMART METERING

BACKGROUND

Smart grid systems use smart meter technologies with advanced information and communication to achieve better balances between energy supply and demand, improve energy conservation and reduce utility costs. In a smart grid system, smart meters are installed at for example commercial buildings or residential households to collect electricity usage data from them in real-time, e.g., every few minutes. Such real-time fine-grained data collection has enabled and improved a wide range of utility services such as billing, load monitoring, forecasting and demand response etc. In a smart grid system, a utility refers to a management system of the smart grid system which can be hardware, software or the combination thereof and might comprise a plurality of layers.

The wide adoption of smart meter technology raises serious concerns from end customers. First, collecting fine-grained electricity usage data raises privacy concerns by end customers as behavioral patterns of customers such as house occupancy, meal time, working hours, are revealed to the utility providers or other parties who can obtain these data. By using data mining techniques, further customer information such as detailed appliance status, marital status, and social activities etc., can also be accurately inferred. Similar privacy concerns are also raised by commercial users because existing work has shown that occupant activities can be accurately inferred using appliance usage data. Then it becomes possible to estimate operation status of a company by changes in working hours and the number of running appliances, or infer that a company is about to release new products by identifying frequent working overtime. Overall, privacy concerns have become one of the main roadblocks for the large-scale deployment of smart meters.

SUMMARY

In one aspect, a computer-implemented method is proposed. According to the method, a plurality of customer-encrypted meter readings are received, each of the plurality of customer-encrypted meter readings being encrypted by a customer using a customer key, then a summation of customer keys is obtained, next the plurality of customer-encrypted meter readings are summed, and the summation of the plurality of customer-encrypted meter readings is decrypted based on the obtained summation of customer keys.

In another aspect, a computing system is proposed. The computing system comprises one or more processing units and one or more computer-readable memory units coupled to the one or more processing units with computer-readable instructions stored thereon, when executed by the one or more processing units implements a method. In the method, a plurality of customer-encrypted meter readings are received, each of the plurality of customer-encrypted meter readings being encrypted by a customer using a customer key, then a summation of customer keys is obtained, next the plurality of customer-encrypted meter readings are summed, and the summation of the plurality of customer-encrypted meter readings is decrypted based on the obtained summation of customer keys.

In another embodiment, a computer program product is proposed. The computer program product is tangibly stored on a non-transient machine readable medium and comprising executable instructions which, when executed on an electronic device, a plurality of customer-encrypted meter readings are received, each of the plurality of customer-encrypted meter readings being encrypted by a customer using a customer key, then a summation of customer keys is obtained, next the plurality of customer-encrypted meter readings are summed, and the summation of the plurality of customer-encrypted meter readings is decrypted based on the obtained summation of customer keys.

It is to be understood that the summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, same or similar reference numerals represent the same or similar elements.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as opened terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
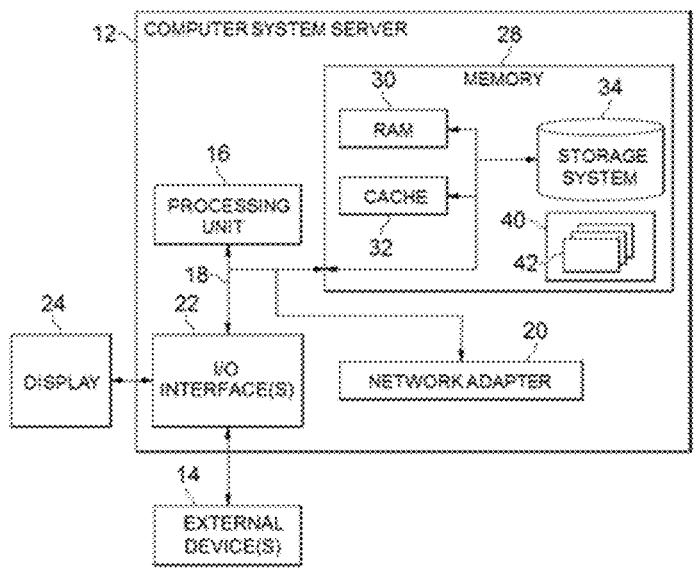
FIG. 1 schematically illustrates an example computer system/server which is applicable to implement embodiments of the present disclosure.

Reference is first made to FIG. 1, in which an example electronic device or computer system/server 12 which is applicable to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
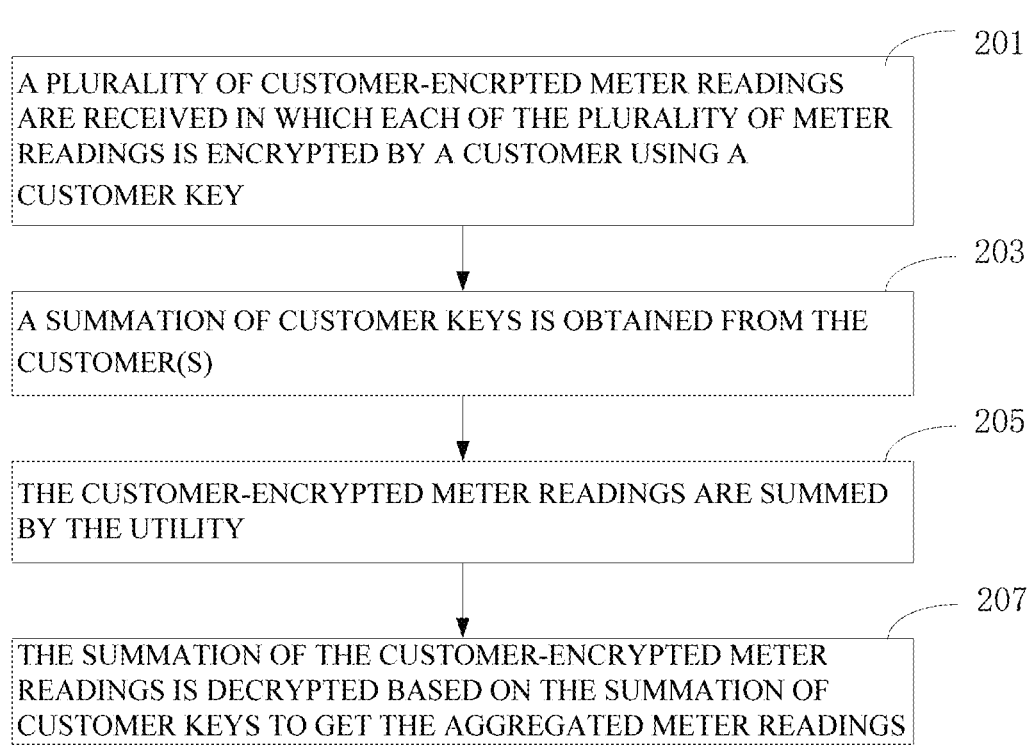
FIG. 2 schematically illustrates a block diagram of a privacy preserving metering method according to an embodiment of the present disclosure.

FIG. 2 schematically illustrates a block diagram for a privacy-preserving metering method according to an embodiment of present disclosure. As illustrated in FIG. 2, in step 201, a plurality of customer-encrypted meter readings are received in which each of the plurality of meter readings is encrypted by a customer using a customer key. The plurality of original meter readings is listed here as $\{m_1, m_2, \ldots, m_q\}$, wherein q is an integer and $q >= 1$, and each of the plurality of original meter readings is encrypted by the customer using a customer key. According to an embodiment of the invention, the plurality of customer-encrypted meter readings can be received from a customer for a given duration (this kind of meter readings can be used for billing of the customer, etc.). According to another embodiment of the invention, the plurality of readings can be received from multiple customers for a given time (this kind of meter readings can be used for load monitoring of the smart grid system, etc.). Each of the plurality of readings is encrypted by a customer(s) with a customer key known to the customer to preserve his/her privacy. According to an embodiment of present invention, the above proposed Customer Encryption (hereinafter referred as CE) scheme could be based One-Time Pad (OTP). Frank Miller first described the OTP system for securing telegraphy in 1882. Then in 1917, Gilbert Vernam (of AT&T Corporation) developed an electrical OTP system and patented it in 1919 (described in U.S. Pat. No. 1,310,719). It should be noted that OTP is only for the purpose of illustration, any other proper encryption method at present or in the future could be applied to present disclosure as long as it satisfies the requirements similar to OTP described herein after. In OTP, each bit or character from the plaintext is encrypted by a modular addition with a bit or character from a secret random key (or pad) of the same length as the plaintext. Different from the original OTP, the plaintext in the proposed CE scheme according to an embodiment of the invention is regarded as large integers instead of bit strings, so that arithmetical calculations such as summation, multiplication and division can be performed on the plaintext. In the proposed CE scheme, a meter reading is disguised by adding a large random number, so that the real value of the meter reading is difficult to recover, i.e., the meter reading is encrypted. Meanwhile, certain aggregated computations especially summations can be conducted on the encrypted data. Using this way, the utility can aggregate the encrypted data and decrypt the aggregated encryption data with an aggregated decryption key without violating the privacy of any individual customer. For the purpose of illustration, the CE scheme is formally defined in Definition 1 in the following; however it should be noted to those skilled in the art that other possible definition could be used. The definition herein below relates to three spaces: a plaintext space, a key space and a cipher-text space. They will be further explained in details in below.

Assuming that the plaintext space is $M \overset{def}{=} \{m | m \in N \cap m \in [0, 2^n)\}$, in which N is a set of natural numbers, and n is the bit-length of the plaintext space M in binary form, and the key space is $K \overset{def}{=} \{k | k \in N \cap k \in [0, 2^n)\}$, and the cipher-text space is $C \overset{def}{=} \{c | c \in N \cap c \in [0, 2^n)\}$. Here defines the operator $\otimes$ on M and K as follows:

$m \otimes k = (m+k) \mod 2^n$ (mod means modulo operation)

Thus, the following properties hold for operator $\otimes$:

$$m \otimes_k = \otimes_m$$

$$m \otimes_{k_a} \otimes_{k_b} = m \otimes_{(k_a + k_b)}$$

$$m \otimes_k \otimes_{(-k)} = m.$$

Then, the CE scheme $\Pi_{CE}$ (Gen, Enc, Dec) is defined as follows, in which Gen stands for Generating a key, Enc stands for Encrypting a plaintext using a key, and Dec stands for Decrypting the encrypted plaintext using the key:

Gen: choose a key k uniformly distributed in $[0, 2^n)$.

Enc: for a given key $k \in [0, 2^n)$ and a plaintext $m \in [0, 2^n)$, output the cipher-text:

$$c = Enc_k(m) = m \otimes_k$$

Dec: for a given key $k \in [0, 2^n)$ and a cipher-text $c \in [0, 2^n)$, output the plaintext:

$$m = Dec_k(c) = c \otimes_{(-k)}$$

It should be noted that any proper random number generation methods can be adopted for the key generation process. As the CE scheme here described is only applicable to an integer space, therefore it is suitable for smart metering scenario because in smart metering, meter readings either are integers or can be scaled to integers.

In order to use the customer-encrypted meter readings, the utility needs the customer keys to decrypt the customer-encrypted meter readings. But customers want to protect his/her privacy, so directly providing the customer keys to the utility is not an option. To solve this conflict, according to an embodiment of the present disclosure, a summation of customer keys is requested to send to the utility. It is depicted in step 203 of FIG. 2, a summation of customer keys is obtained from the customer(s). As mentioned above, customer keys are integers and they can be summed up to get a summation by the customer. Then the summation can be sent to the utility by the customer initiatively or upon the request of the utility. According to an embodiment of the present disclosure, only the summation is obtained by the utility, therefore the utility cannot decrypt each individual customer-encrypted meter reading, neither derive any customer privacy. The detailed procedure to generate a summation of customer keys by a customer is described in Algorithm 1 in below.

CEsum ($K_{CE}$), $K_{CE}$ corresponds to a customer key in CE scheme and selected from the set $K_{CE} = \{k_1, k_2, \ldots, k_q\}$;

Let $k_{CE} = 0$;

for each $k_i \in K_{CE}$ (wherein $i \in [1, \ldots, q]$) do $k_{CE} = k_{CE} + k_i$;

end for

After the summation of customer keys ($k_{CE}$) is generated according to Algorithm 1, it can be sent to the utility by the customer initiatively or upon request of the utility, as described above.

Next, in step 205, the customer-encrypted meter readings are summed by the utility. As the customer-encrypted meter readings are encrypted using the CE scheme mentioned above, the summation of the customer-encrypted meter readings $\varepsilon_m$ will also need the CE scheme. The detailed procedure to aggregate (i.e. to sum up) the customer-encrypted meter readings by the utility is described in Algorithm 2 in below.

Merging($E_M$)

The set of customer-encrypted meter readings are $E_M = \{\varepsilon_{m_1}, \ldots, \varepsilon_{m_q}\}$ (n>1), in which $m_1, m_2, \ldots, m_q$ are the meter readings before encrypted by a customer(s) and $\varepsilon_{m_1}, \ldots, \varepsilon_{m_q}$ are the meter readings after the encryption by a customer;

Let $\varepsilon_m = 0$;

for each $\varepsilon_{m_i} \in E_M$ do $\varepsilon_m = \varepsilon_m \otimes \varepsilon_{m_i}$;

end for return $\varepsilon_m$;

Next, in step 207, the summation of the customer-encrypted meter readings is decrypted based on the summation of customer keys($k_{CE}$) to get the aggregated meter readings. The utility can obtain aggregated meter readings of the customer(s) using the following formula 1.

$$\varepsilon'_m = \varepsilon_m \otimes (-k_{CE}) \qquad (1)$$

Further, the utility can utilize the obtained aggregated meter readings for billing, load monitoring, forecasting or demand response etc., in the meantime, privacy of the customers is protected.

It is described above a method for privacy-preserving smart metering according to an embodiment of the invention. However, with adopting the privacy-preserving smart metering, it opens an opportunity for malicious customers to manipulate the data, as most of the existing methods utilizing cryptography techniques, data randomization etc. will require customer-side data processing. That is to say, meter readings need be open to customers. Electricity theft will become a concern in a smart grid system with privacy-preservation as malicious customers can tamper with their local smart meters to report a lower usage. Existing approaches fail to solve this problem.

Figure 3:
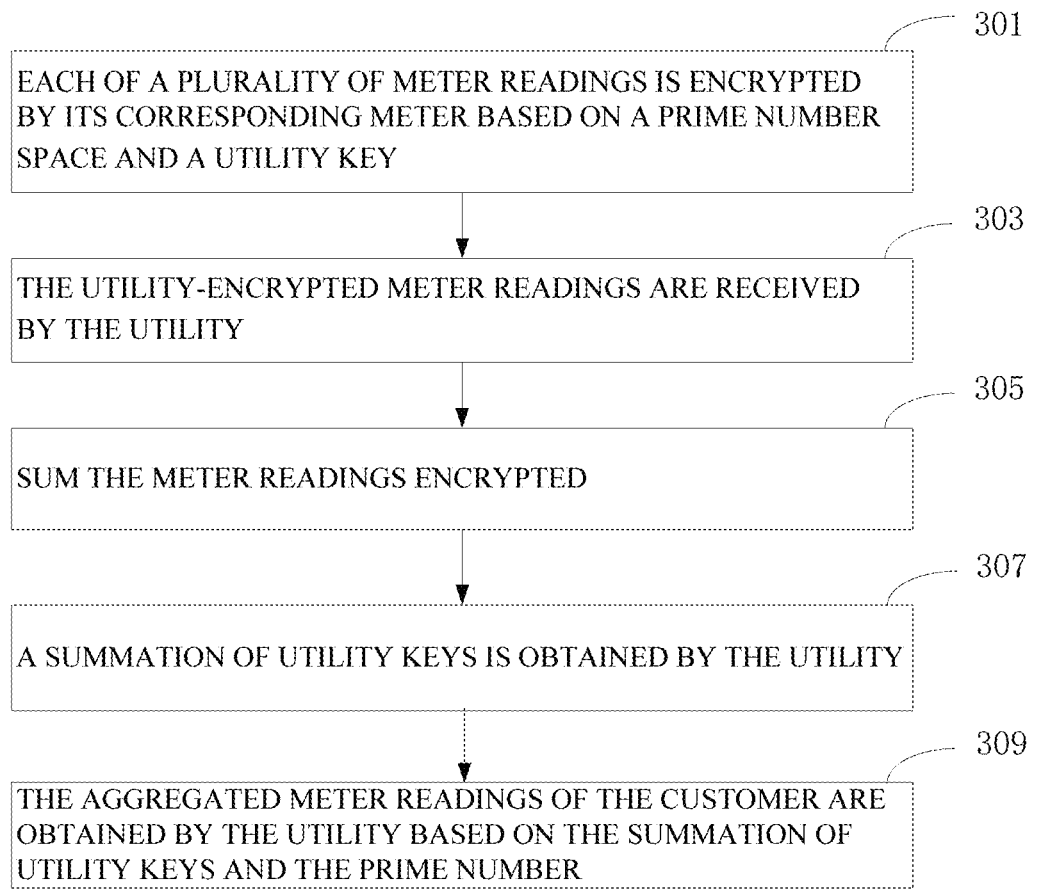
FIG. 3 schematically illustrates a block diagram of a tamper-proof metering method according to one embodiment of the present disclosure.

As mentioned above, there is a possibility that meter readings can be tampered with by malicious customers if they are open to customers. To address this potential problem, it is depicted in FIG. 3 a block diagram for a tamper-proof smart metering method according to an embodiment of the present disclosure. In step 301 of FIG. 3, each of a plurality of meter readings is encrypted by its corresponding meter based on a prime number space and a utility key. When a meter reading is generated, it will be first encrypted by its corresponding meter using a Utility Encryption (herein after referred as UE) Scheme based on a prime number space. The UE scheme (GenM, EncM, DecM) is formally defined in the following in Definition 2:

Assuming that the prime number space is $p \stackrel{def}{=} \{p | p \in N \cap p \in [0, 2^l)\}$, in which N is a set of natural numbers, l is the maximum bit-length of values in binary format in the prime number space P. If l is large enough, e.g., larger than 2000 or 5000, a 1024-bit or 4096-bit prime number can be chosen and it will be large enough in real applications and p will be a big prime number.

The plaintext space is $M \stackrel{def}{=} \{m | m \in N \cap m \in [0, 2^{n-l})\}$, the utility key space is $K \stackrel{def}{=} \{k | l \in N \cap k \in [0, 2^n)\}$, and the cipher-text space is $C \stackrel{def}{=} \{c | c \in N \cap c \in [0, 2^n)\}$. Then, the UE scheme $\Pi_{CE}$ (GenM, EncM, DecM) is defined as follows, in which GenM stands for Generating a key by a meter, EncM stands for Encrypting a plaintext using a key by the meter, and DecM stands for Decrypting the encrypted plaintext using the key by the meter. Different from the CE scheme, the UE scheme utilizes a prime number space:

GenM: choose a key k uniformly distributed in $[0, 2^n)$.

EncM: for a given key k∈[0, $2^n$) and a message m∈[0, $2^n$), output the cipher-text:

c=$EncM_k$(m)=(m·p)⊗k, p is randomly generated in [0, $2^l$].

DecM: for given a key k∈[0, $2^n$) and a cipher-text c∈[0, $2^n$), output the plaintext:

$$m = DecMac_k(c) = \frac{c \otimes (-k)}{p}.$$

In the proposed UE scheme, a meter reading m is encrypted as c=(m·p)⊗k, as p is randomly generated by the meter and will not change, summation of any given cipher-texts $c_1$=($m_1$·$p_1$)⊗$k_1$ and $c_2$=($m_2$·$p_2$)⊗$k_2$ can be supported, i.e., $DecM_{(k1+k2)}$($c_1$+$c_2$)=$m_1$+$m_2$. Meanwhile, for any cipher-text c=(m·p)⊗k, if it is tampered with by a customer from c to another value: c'=c+δ(δ≠0), the result of decryption:

$$DecM_k(c') = \frac{(-k) \otimes (c+\delta)}{p} = \frac{(-k) \otimes c}{p} + \frac{(-k) \otimes \delta}{p} = c + \frac{(-k) \otimes \delta}{p}$$

will not be an integer, because $$\frac{(-k) \otimes \delta}{p} = \frac{(\delta - k)(\bmod 2^n)}{p},$$

and the result of (δ−k)(mod $2^n$) divided by the prime number p will not be with a probability infinitely close to. This is because if the customer has tampered with the meter reading, the result of the tampered meter reading received by the utility divided by the prime number p will not be an integer. Note that, the prime number p can be transferred to the utility by any existing secure transmission methods, including but not limited to for example RSA-based methods. Meanwhile, the value of the prime number p may vary among different customers, but must be the same for those customers whose real-time usage need to be aggregated horizontally for the purpose of load monitoring etc. In summary, with the proposed UE scheme, if a customer has tampered with his/her meter readings, it will be effectively detected.

Next, in step 303, the utility-encrypted meter readings are received by the utility. Then, the utility-encrypted meter readings can be summed in step 305 by the utility to get a summation of utility-encrypted data $\varepsilon_m$ according to the proposed UE scheme. The process of summing up the utility-encrypted meter readings is similar to the process described above according to the Algorithm 2.

Next, in step 307, a summation of utility keys is obtained by the utility. Here as an example, RSA cryptosystem is adopted to transmit the utility key set $K_{UE}$ securely, in which $K_{UE}$={$k'_1$, $k'_2$, ..., $k'_q$}, $k'_1$, $k'_2$, ..., $k'_q$ are the utility keys. Then, a summation of the utility keys $k_{UE}$($k_{UE}$=$\Sigma_{k' \in K_{UE}} k'_i$) can be calculated similar to the process described above according to the Algorithm 1. After obtaining the summation of utility keys $k_{UE}$, the aggregated meter readings of the customer can further be obtained by the utility based on the summation of utility keys and the prime number p according to Algorithm 3 in the following in step 309.

UE_Decrypting($k_{UE}$, p)

$\varepsilon_m$ is the summation of utility-encrypted meter readings, $k_{UE}$ is utility keys according to the UE scheme, and p is the corresponding prime number obtained by the utility from the customer(s) according to the UE scheme.

Figure 4:
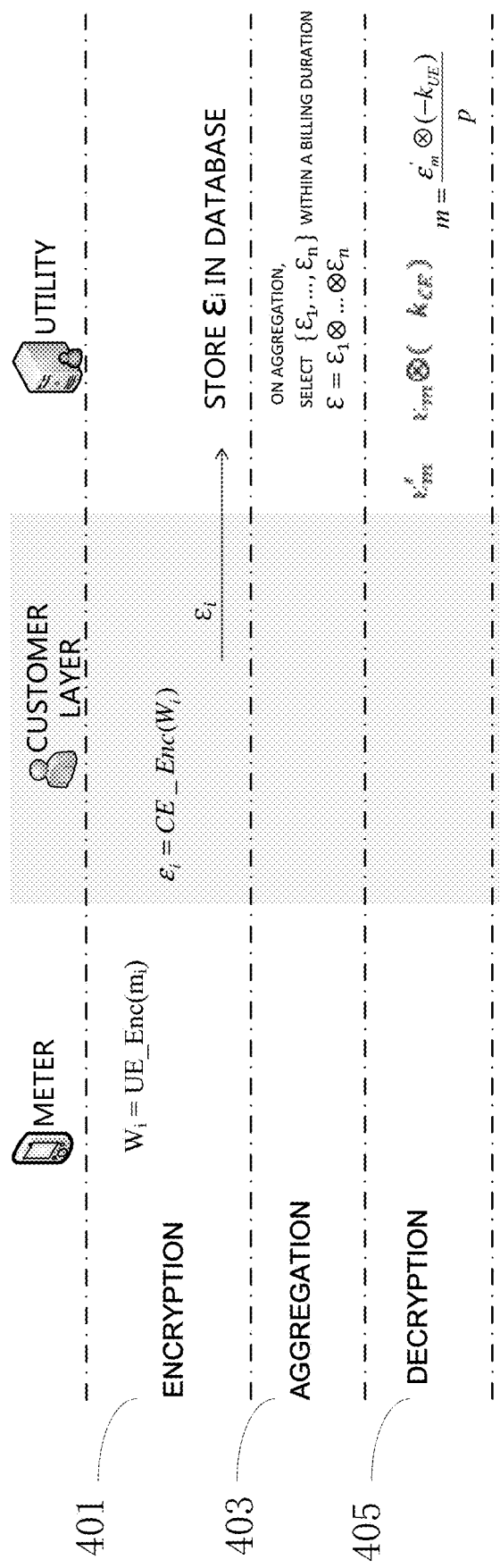
FIG. 4 schematically illustrates a flowchart of a method for tamper-proof and privacy-preserving metering according to one embodiment of the present disclosure.

Let $$m = \frac{\varepsilon_m \otimes (-k_{UE})}{p};$$

if m is not an integer then
Throw an exception that the customer has cheated;
end if
return m as the trustworthy result;

Now, referring to FIG. 4, which schematically illustrates a flowchart of a method for tamper-proof and privacy-preserving smart metering according to an embodiment of present disclosure. The method for tamper-proof and privacy-preserving smart metering can be used for billing purpose for example. It can also be used in other scenarios such as load monitoring. Here only use the billing scenario for the purpose of illustration. In Step 401 of FIG. 4, meter readings are double encrypted, i.e., firstly encrypted by meters according to the UE scheme and then by customers according to the CE scheme. In the billing scenario, the meter readings are for a given billing period from one target customer. It has been described in the above about the UE scheme and CE scheme in details in which the outputs of the utility-encryption according to the UE scheme function as inputs of the customer-encryption according to the CE scheme as described in the formula 2, wherein $m_i$ is a meter reading, $W_i$ is the utility-encrypted meter readings according to the UE scheme, $\varepsilon_i$ is the double encrypted meter readings, i.e., customer-encryption of the utility-encrypted meter readings $W_i$ according to the CE scheme.

$$W_i=\text{UE\_Enc}(m_i), \varepsilon_i=\text{CE\_Enc}(W_i) \quad (2)$$

Next, in Step 403, the double encrypted meter readings are summed up. The detailed process to aggregate the double-encrypted meter readings by the utility is similar to process described according to the Algorithm 1 mentioned above, with the only difference lies in that the meter readings are double encrypted data according to the CE scheme and the UE scheme, which allows the utility to be able to obtain double-encrypted meter readings for a duration t (such as one month, or half a year or even one year etc.) from the targeting user for the billing purpose.

Next, in Step 405, the result of whether meter readings are trustworthy is obtained. After the double encrypted meter readings are aggregated, the utility can send a request to the target customer and asks the target customer to send the summation of customer keys for the duration T. As described above, the summation of customer keys for the duration t is generated according to the process described in the Algorithm 2. And the utility key $k_{UE}$ can be obtained according to above-mentioned step 307. After obtaining the summation of customer keys $k_{CE}$ and the utility key $k_{UE}$, the aggregated meter readings of the customer for the duration T can be obtained according to the following Algorithm 4.

CE_UE_Decrypting($\varepsilon_m$, $k_{CE}$, $k_{UE}$, p)

$\varepsilon_m$ is the summation of double-encrypted meter readings, $k_{CE}$ is the summation of customer keys, $k_{UE}$ is the summation of utility keys, and p is the corresponding prime number according to the UE scheme mentioned above.

Let $\varepsilon'_m = \varepsilon_m \otimes (-k_{CE})$;
Let $$m = \frac{\varepsilon'_m \otimes (-k_{UE})}{p};$$

if m is not an integer then
Throw an exception that target customer has tampered with meter readings;
end if
return m as the trustworthy result;

It is described in the above the method for tamper-proof and privacy-preserving smart metering for billing purpose as example. Now, it will be described in the following the method for tamper-proof and privacy-preserving smart metering for load monitoring purpose. For load monitoring purpose, meter readings are from multiple customers for a given time. Similar to the billing scenario described above, load monitoring scenario also requires a summation of meter readings, a decryption according to the CE scheme, and a decryption according to the UE scheme. In load monitoring scenario, the summation of meter readings is exactly the same as that in the billing scenario except that the summation is towards double-encrypted metering readings of all customers at a given time t. Thus, the summation of meter readings in load monitoring scenario is omitted.

After obtaining the summation of double-encrypted meter readings $\varepsilon_m$ for load monitoring, the utility needs to generate a summation of customer keys $k_{CE}^t = \Sigma_{k \in K_{CE}^t} k$ to decrypt $\varepsilon_m$ ($K_{CE}^t$ is a set of keys generated by customers in a monitoring region at a given time t in according to their CE schemes respectively). As each customer key in $K_{CE}^t$ can be used to decrypt the corresponding meter reading of the customer respectively, it is important to keep all the customer keys in $K_{CE}^t$ private during the summation generation process. To this end, a secure multi-party computation protocol—SecureSum is adopted (please refer to the paper for the protocol SecureSum—Li, D.; Lv, Q.; Xia, H.; Shang, L.; Lu, T.; Gu, N. Pistis: *A Privacy-Preserving Content Recommender System for Online Social Communities*. 2011 IEEE/WIC/ACM International Conference on Web Intelligence and Intelligent Agent Technology (WI-IAT), 2011, pp. 79-86.) to achieve summation of n customer keys of the n customers without revealing the customer keys during the computation. The detailed process to calculate the summation of customer keys according to the SecureSum protocol is described in Algorithm 5 in the following.
SecureSum_Key (U, $K_{CE}^t$, t)
U is a set of customers in the monitoring region, $K_{CE}^t$ is the set of customer keys generated by the set of customers U at the given time t according to their CE schemes respectively.
while not all customers have participated do
Randomly choose h users (h>2) as $U_j \subset U$;
for each $u_i \in U_j$ do
  $u_i$ randomly divides its key $k_i$ into a set of segments $S_{u_i} = \{s_1, \ldots, s_h\}$ while ensuring that $\Sigma_{i=1}^h s_i = k_i$;
  $u_i$ successively sends every $s_j$ to $u_j \in U_j$, but keep $s_i$ by itself, wherein j is a natural number;
  If h−1 segments have been received then
  $u_i$ computes the summation of all segments it holds as $sum_i$;
  $u_i$ sends $sum_i$ to the utility;
  end if
end for
end while The utility computes $k_{CE}^t = \Sigma_{u_i \in U} sum_i$;

The SecureSum_Key procedure may introduce high communication latency, because it requires multi-party computation. But it should be noted that the Gen operation in the CE scheme is independent of the Enc operation, so that $$\sum_{k \in K_{CE}^t} k$$

can be computed before time t if the customers can generate their keys in advance. In other words, such high communication latency is not on the critical path of data aggregation. Therefore, privacy-preserving load monitoring can be achieved by the utility in real time. After obtaining the customer key of CE scheme—$k_{CE}^t$, the utility can compute the utility key of UE scheme—$k_{UE}^t$ similarly to the computation of $k_{UE}$ in the above privacy-preserving billing. Then, the utility can decrypt the load monitoring result in the same way as Algorithm 4.

Various embodiments implementing the method of the present disclosure have been described above with reference to the accompanying drawings. Those skilled in the art may understand that the method may be implemented in software, hardware or a combination of software and hardware. Moreover, those skilled in the art may understand by implementing steps in the above method in software, hardware or a combination of software and hardware, there may be provided an apparatus/system based on the same disclosure concept. Even if the apparatus/system has the same hardware structure as a general-purpose processing device, the functionality of software contained therein makes the apparatus/system manifest distinguishing properties from the general-purpose processing device, thereby forming an apparatus/system of the various embodiments of the present disclosure. The apparatus/system described in the present disclosure comprises several means or modules, the means or modules configured to execute corresponding steps. Upon reading this specification, those skilled in the art may understand how to write a program for implementing actions performed by these means or modules. Since the apparatus/system is based on the same disclosure concept as the method, the same or corresponding implementation details are also applicable to means or modules corresponding to the method. As detailed and complete description has been presented above, the apparatus/system is not detailed below.

According to one embodiment of the present disclosure, a computing system is proposed. The computing system comprises one or more processing units and one or more computer-readable memory units coupled to the one or more processing units with computer-readable instructions stored thereon, when executed by the one or more processing units implements a method. In the method, a plurality of customer-encrypted meter readings are received, each of the plurality of customer-encrypted meter readings being encrypted by a customer using a customer key, then a summation of customer keys is obtained, next the plurality of customer-encrypted meter readings are summed, and the summation of the plurality of customer-encrypted meter readings is decrypted based on the obtained summation of customer keys.

In one embodiment of the present disclosure, the meter readings are for a given duration and from one customer.

In one embodiment of the present disclosure, the meter readings are for a given time and from multiple customers.

In one embodiment of the present disclosure, each of the plurality of customer-encrypted meter readings is encrypted by a meter based on a prime number space and a utility key before being encrypted by the customer.

In one embodiment of the present disclosure, in the method, a plurality of utility keys are obtained from the meter(s); and the plurality of utility keys are summed.

In one embodiment of the present disclosure, in the method, the decrypted summation of the customer-encrypted meter readings are further decrypted based on the summation of the plurality of utility keys and the prime number space; and if the result of the further decryption is an integer, the further decrypted summation being trustworthy is determined.

In one embodiment of the present disclosure, a summation of customer keys including using a secure multi-party computation protocol is obtained.

According to one embodiment of the present disclosure, a computer program product is proposed. The computer program product is tangibly stored on a non-transient machine-readable medium and comprising machine-executable instructions. The instructions, when executed on an electronic device, cause the electronic device to: a plurality of customer-encrypted meter readings are received, each of the plurality of customer-encrypted meter readings being encrypted by a customer using a customer key, then a summation of customer keys is obtained, next the plurality of customer-encrypted meter readings are summed, and the summation of the plurality of customer-encrypted meter readings is decrypted based on the obtained summation of customer keys.

In one embodiment of the present disclosure, the meter readings are for a given duration and from one customer.

In one embodiment of the present disclosure, the meter readings are for a given time and from multiple customers.

In one embodiment of the present disclosure, each of the plurality of customer-encrypted meter readings is encrypted by a meter based on a prime number space and a utility key before being encrypted by the customer.

In one embodiment of the present disclosure, a plurality of utility keys are obtained from the meter(s); and the plurality of utility keys are summed.

In one embodiment of the present disclosure, the instructions may further cause the electronic device to: further decrypting the decrypted summation of the customer-encrypted meter readings based on the summation of the plurality of utility keys and the prime number space; and if the result of the further decryption is an integer, determining the further decrypted summation being trustworthy.

In one embodiment of the present disclosure, a summation of decryption keys from the customer(s) including using a secure multi-party computation protocol is obtained.

Moreover, the system may be implemented by various manners, including software, hardware, firmware or a random combination thereof. For example, in some embodiments, the apparatus may be implemented by software and/or firmware. Alternatively or additionally, the system may be implemented partially or completely based on hardware. for example, one or more units in the system may be implemented as an integrated circuit (IC) chip, an application-specific integrated circuit (ASIC), a system on chip (SOC), a field programmable gate array (FPGA), etc. The scope of the present intention is not limited to this aspect.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A computer-implemented method, comprising:
receiving a plurality of double-encrypted meter readings from a smart meter, each of the plurality of double-encrypted meter readings being encrypted using a double encryption technique, the double encryption technique comprising:
performing a first encryption of each of a plurality of meter readings using a respective utility key as follows:
generating a prime number;
calculating a product of the prime number and a respective meter reading of the plurality of meter readings,
calculating a first sum by summing the respective utility key with the product,
calculating a first remainder by dividing the first sum by $2^n$, where n is a bit-length of a plaintext space of the respective meter reading in binary form, and
generating a respective utility encrypted meter reading based on the first remainder; and
performing a second encryption of the utility-encrypted meter readings using a respective customer key as follows:
calculating a second sum by summing the respective customer key with the respective meter reading,
calculating a second remainder by dividing the second sum by $2^n$, where n is the bit-length of the plaintext space of the respective meter reading in binary form, and
generating a respective double encrypted meter reading based on the second remainder;
obtaining a summation of utility keys;
obtaining a summation of customer keys;
summing the plurality of double-encrypted meter readings;
decrypting the summation of the plurality of double-encrypted meter readings based on the obtained summation of utility keys and the obtained summation of customer keys; and
determining a trustworthiness of the plurality of double-encrypted meter readings based at least in part on decrypting the summation of the plurality of double-encrypted meter readings.

2. The method of claim 1, wherein the double-encrypted meter readings are for a given time and from multiple customers.

3. The method of claim 1, wherein each of the plurality of double-encrypted meter readings is encrypted by a meter based on a prime number space and the respective utility key before being encrypted by the respective customer key.

4. The method of claim 3, the method further comprising:
obtaining a plurality of utility keys from a plurality of smart meters; and
summing the plurality of utility keys.

5. The method of claim 4, the method comprising:
further decrypting the decrypted summation of the double-encrypted meter readings based on the prime number space; and
if the result of the further decryption is an integer, determining the further decrypted summation being trustworthy.

6. The method of claim 2, wherein obtaining a summation of customer keys includes using a secure multi-party computation protocol.

7. A computing system, comprising:
one or more processing units;
one or more computer-readable memory units coupled to the one or more processing units with computer-readable instructions stored thereon, when executed by the one or more processing units implements a method comprising:
receiving a plurality of double-encrypted meter readings, each of the plurality of double-encrypted meter readings being encrypted using a double encryption technique, the double encryption technique comprising:
performing a first encryption of each of a plurality of meter readings from a smart reader using a respective utility key as follows:
generating a prime number;
calculating a product of the prime number and a respective meter reading of the plurality of meter readings,
calculating a first sum by summing the respective utility key with the product,
calculating a first remainder by dividing the first sum by $2^n$, where n is a bit-length of a plaintext space of the respective meter reading in binary form, and
generating a respective utility encrypted meter reading based on the first remainder; and
performing a second encryption of the utility-encrypted meter readings using a respective customer key as follows:
calculating a second sum by summing the respective customer key with the respective meter reading,
calculating a second remainder by dividing the second sum by $2^n$, where n is the bit-length of the plaintext space of the respective meter reading in binary form, and
generating a respective double encrypted meter reading based on the second remainder;
obtaining a summation of utility keys;
obtaining a summation of customer keys;
summing the plurality of double-encrypted meter readings;
decrypting the summation of the plurality of double-encrypted meter readings based on the obtained summation of utility keys and the obtained summation of customer keys; and
determining a trustworthiness of the plurality of double-encrypted meter readings based at least in part on decrypting the summation of the plurality of double-encrypted meter readings.

8. The system of claim 7, wherein the meter readings are for a given time and from multiple customers.

9. The system of claim 7, wherein each of the plurality of double-encrypted meter readings is encrypted by a meter based on a prime number space and the respective utility key before being encrypted by the respective customer key.

10. The system of claim 9, the method further comprising:
obtaining a plurality of utility keys from a plurality of smart meters; and
summing the plurality of utility keys.

11. The system of claim 10, the method comprising:
further decrypting the decrypted summation of the double-encrypted meter readings based on the prime number space; and
if the result of the further decryption is an integer, determining the further decrypted summation being trustworthy.

12. The system of claim 7, wherein obtaining a summation of customer keys includes using a secure multi-party computation protocol.

13. A computer program product being tangibly stored on a non-transient machine-readable medium and comprising machine-executable instructions, the instructions, when executed on an electronic device, causing the electronic device to:
receive a plurality of double-encrypted meter readings from a smart meter, each of the plurality of double-encrypted meter readings being using a double encryption technique, the double encryption technique comprising:
performing a first encryption of each of a plurality of meter readings using a respective utility key as follows:
generating a prime number;
calculating a product of the prime number and a respective meter reading of the plurality of meter readings,
calculating a first sum by summing the respective utility key with the product,
calculating a first remainder by dividing the first sum by $2^n$, where n is a bit-length of a plaintext space of the respective meter reading in binary form, and
generating a respective utility encrypted meter reading based on the first remainder; and
performing a second encryption of the utility-encrypted meter readings using a respective customer key as follows:
calculating a second sum by summing the respective customer key with the respective meter reading,
calculating a second remainder by dividing the second sum by $2^n$, where n is the bit-length of the plaintext space of the respective meter reading in binary form, and
generating a respective double encrypted meter reading based on the second remainder;
obtain a summation of utility keys;
obtain a summation of customer keys;
sum the plurality of double-encrypted meter readings; and
decrypt the summation of the plurality of double-encrypted meter readings based on the obtained summation of utility keys and the obtained summation of customer keys; and
determining a trustworthiness of the plurality of double-encrypted meter readings based at least in part on decrypting the summation of the plurality of double-encrypted meter readings.

14. The computer program product of claim 13, wherein the meter readings are for a given time and from multiple customers.

15. The computer program product of claim 13, wherein each of the plurality of double-encrypted meter readings is encrypted by a meter based on a prime number space and the respective utility key before being encrypted by the respective customer key.

16. The computer program product of claim 13, the instructions further causing the electronic device to:
obtaining a plurality of utility keys from a plurality of smart meters; and
summing the plurality of utility keys.

17. The computer program product of claim 15, the instructions further causing the electronic device to:
further decrypting the decrypted summation of the double-encrypted meter readings based on the prime number space; and
if the result of the further decryption is an integer, determining the further decrypted summation being trustworthy.

* * * * *